US006585845B1

(12) United States Patent
Peterson

(10) Patent No.: US 6,585,845 B1
(45) Date of Patent: Jul. 1, 2003

(54) NAME BADGE WITH DIGITALLY PRODUCED IMAGE THEREON

(75) Inventor: James P. Peterson, Manitowoc, WI (US)

(73) Assignee: Contemporary, Inc., Manitowoc, WI (US)

( * ) Notice: Subject to any disclaimer, the term of this patent is extended or adjusted under 35 U.S.C. 154(b) by 0 days.

(21) Appl. No.: 09/507,310

(22) Filed: Feb. 18, 2000

(51) Int. Cl.[7] .............................................. B32B 31/00

(52) U.S. Cl. ...................... 156/257; 156/264; 156/267; 156/268; 156/277; 283/75; 283/77

(58) Field of Search ................................ 156/253, 257, 156/264, 267, 268, 277; 283/74, 75, 77, 80, 81, 904

(56) References Cited

U.S. PATENT DOCUMENTS

| | | | | | |
|---|---|---|---|---|---|
| 3,642,552 | A | * | 2/1972 | Sibley | 156/108 |
| 4,459,772 | A | * | 7/1984 | Kanzelberger | 156/219 |
| 5,210,966 | A | * | 5/1993 | Fuehrer | 24/707.6 |
| 5,283,966 | A | * | 2/1994 | Rader et al. | 40/1.5 |
| 5,413,383 | A | * | 5/1995 | Laurash et al. | 229/300 |
| 5,622,758 | A | * | 4/1997 | Hollis et al. | 283/81 |
| 5,653,472 | A | * | 8/1997 | Huddleston et al. | 283/75 |
| 5,719,828 | A | * | 2/1998 | Haas et al. | 116/200 |
| 5,770,289 | A | * | 6/1998 | Tracy | 283/81 |
| 6,013,154 | A | * | 1/2000 | Thomas-Cote | 156/230 |
| 6,095,567 | A | * | 8/2000 | Buell | 283/75 |
| 6,136,130 | A | * | 10/2000 | Tataryan et al. | 156/249 |
| 6,159,570 | A | * | 12/2000 | Ulrich et al. | 283/109 |
| 6,174,402 | B1 | * | 1/2001 | Nakano et al. | 156/247 |
| 6,196,593 | B1 | * | 3/2001 | Petrick et al. | 283/101 |
| 6,197,396 | B1 | * | 3/2001 | Haas et al. | 283/81 |
| 6,254,952 | B1 | * | 7/2001 | Fox et al. | 283/105 |
| 6,294,237 | B1 | * | 9/2001 | Popat | 283/101 |
| 6,318,757 | B1 | * | 11/2001 | Ritchie et al. | 283/101 |

* cited by examiner

*Primary Examiner*—Mark A. Osele
(74) *Attorney, Agent, or Firm*—Michael Best & Friedrich, LLC

(57) ABSTRACT

A uniquely shaped plate may be transmitted through a card printer designed to print on only a card having a standard size and shape. The plate includes a laminate including a card having a sheet of backing material affixed thereto, preferably by an easy release adhesive. For example, the card may have a backing, such as release paper. If the plate is a flexible material, the backing material is a rigid sheet. The standard card is kiss cut through its thickness to form segments having contours for making said unique shape. However, the kiss cut does not cut the sheet of backing material, which continues to hold the segments in place. Therefore, the card retains its standard size and shape so that it may be sent through the card printer with the segments in place. Then, the segments are separated.

13 Claims, 2 Drawing Sheets

NAME BADGE WITH DIGITALLY PRODUCED IMAGE THEREON

This invention relates to name badges and more particularly to a process for making name badges having a digitally produced image printed thereon, and especially to such badges made of a thermally debossable and other plastic material.

For convenience of expression, the term "badge" is used hereinafter to generically identify all similar devices such as badges, trophies, business cards, awards, ID card, luggage tags, signs, key ring tags, and the like.

Reference is made to U.S. Pat. Nos. 3,940,864; 4,047,996; 4,267,224; 4,125,655; 4,459,772; 4,497,248; 5,305,538; and 5,398,435. These Patens relate to a thermally debossable ("thermal printing") plastic material which may be used to provide a name badge having a jewelry like quality and an engraved appearance. The badges made of this material look like engraved brass, gold, or silver plates.

The thermally printing and debossable plastic material is covered by a plastic film with a metallized surface and may be imprinted by hot stamping which is a fairly expensive process that requires a relatively high degree of expertise. While it is easy for a person to acquire this expertise to use thermal printing if he does so every few days, it is not too easy for the casual user who may use it once every six or eight months, for example. From the manufacturer's viewpoint, the office procedures required to take orders, print or stamp the plates in response to the specific orders, ship the stamped plates, bill and collect, answer complaints, etc. require a relatively large service organization.

Some of these prior patents use a plastic plate with a field of textured material in combination with a transparent tape having a pressure sensitive adhesive and with graphics on the back of the tape. When the tape is pressed over the textured area, the badge appears to have graphics sealed in the plastic forming the badge.

The invention is not limited to thermally debossible material. Quite the contrary, any suitable "card material" (such as PVC) may be used. This is especially important since modern plastics may have almost any appearance such as gold, silver, marble, leather, wood, or the like. Some of these newer materials are available from the Rowmark Company and the Innovative Plastics Company.

On the other hand, many new procedures for making badges involve card printers using digital data in order to form images. For example, the Credentia Company of 111 Bren Road West, Minnotonka, Minn. 55343-9015 produces a line of printers, software, cameras, video equipment, and the like. This company's card printer product is sold under the name Data Card. Other companies manufacturing card printers such as this are Direct Color and Magic Card.

I have discovered that the thermal printing material is very well suited for use in these and other card printers. Moreover, the thermal printing machines offer the added benefit of mixing various printing techniques in order to make a truly unique card.

Digital cameras store the digital image data in a memory which may be fed into a computer that is a part of or drives a card printer to print out the image. Likewise, images on 35 mm film, or the like, are being delivered to a customer in a digital image data form. Hence, a card printer may use any of this digital image data in order to place a person's picture or written material on a badge, id card, or the like.

Usually, the card material is then fed through the card printer machine, printed, and then cut to size or shape. The invention eliminates procedures for cutting the material which would normally follow the printing of the card material. This card printing has become more important since the introduction of this process to the Awards and Engraving industry and because of the nature of that industry.

It would be highly desirable to combine the known prior art structures and techniques, the thermally printing and debossible material, and similar plastic material with the digital image printing equipment so that the best features of each may be utilized. That way existing and: new techniques may be mixed and matched. Thus, for example, a company logo may be debossed into and thermally printed on the plastic material and then the name, title, and picture of a person may be printed on the plastic material. Or, everything except a person's name may be prepared and then the person may add his own name on a do-it-yourself basis. Some of the above cited patents enable one to type his own name on a transparent tape and to press it onto the partly completed badge. The point is that many unique badges may be made on a design-it-yourself basis, on a partially do-it-yourself basis, or on a completely custom made basis. Moreover, by combining technologies, very unique badges maybe made in a one of a kind design.

Another point of interest is in novelty items such as luggage tags, key ring tags, or the like which may have unique features, such as the outline of a well known cartoon character. The crew of a cruise line might want to wear name badges cut out in the outline of the particular ship on which they serve.

A difficulty with such creativity is that a card printer which uses digital imaging to make badges is generally designed for use with material of a specific shape and size. Thus, for example, usually business cards, driver's licenses, luggage tags and the like must be a fixed size and shape before a card printer may be used, while creatively may seek to use a plastic plate having a shape in a ship's outline, a circular disk, star or sheriffs badge, for example. For convenience of expression, these and any other suitable shapes will be called, "A unique size and shape which is not a fixed size and shape." How will a restaurant, hotel, casino, cruise ship, country club, retail store, or amusement park achieve the cutting process? The focus of these and other types of end users is not the same as these in an Awards or Engraving (Trophy) business. They want the process to be as easy as possible and do not want to make an investment necessary to further process a blank.

The inventive process involves pre-cutting the material to the desired shape before it is fed through the card printer machine. In the prior art scenario, the material would be fed through the card printer machine and then cut to shape after it is printed. Since the material is pre-cut into the desired shape before it is printed, the end user does not have to provide extra process steps to complete the badge.

Accordingly, an object of the invention is to provide a process which makes it possible to use the best feature of many techniques including both the thermal printing on debossible plastic and the modern card printers. Here, an object is to open channels for creativity without requiring uniquely designed card printers.

Yet another object is to accomplish the foregoing objects with a minimum amount of specially designed production equipment and at a minimum capital requirement for entry into the business of making badges.

In keeping with an aspect of the invention, these and other objects of the invention are provided by a process wherein a standard size card made of suitable material is selected and then covered on its under-surface by a sheet of backing material adhered thereto. The next step depends upon the material that is used. For some particularly flexible materials, a rigid carrier backing plate may be temporarily added to the card material during their trip through the card printer machine. For the debossible, thermal printing plastic material, a suitable logo, depression, textured strip, etc. step may be applied to the card. Then, the card is cut (sometimes called "kiss cut") to the desired end shape and to a depth which cuts the card material without penetrating the sheet of backing material. This "kiss cut" separates the card material into a segment or segments held in place by the sheet backing material. The kiss cut material may then be run directly through the card printer because the card remains the standard size and shape. Then, the backing material is peeled away from the kiss cut card material to separate the segments from the card. Finally, any suitable mounting step may be carried out to form a means for an attachment (such as adding a suitable finding hole, jump ring, etc.) of the separated segment or segments of card material.

Another unique feature of the inventive process that is that the material may be hot stamped, silk screened, or some other form of printing may be applied before being fed through the card printer. Even though this card printer is capable of printing in full color, the vibrancy of silk screening and hot stamping is not otherwise achieved on certain materials.

The invention will be better understood from the following description, taken with the attached drawings in which.

Figure 1:
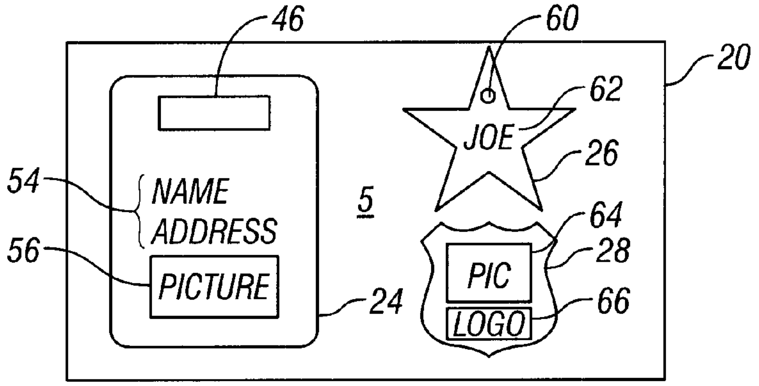
FIGS. 1 and 2 are plan views of a suitable card material having a standard size and shape which fits into a card printer, with segments of the card material formed by a kiss cut.
Figure 2:
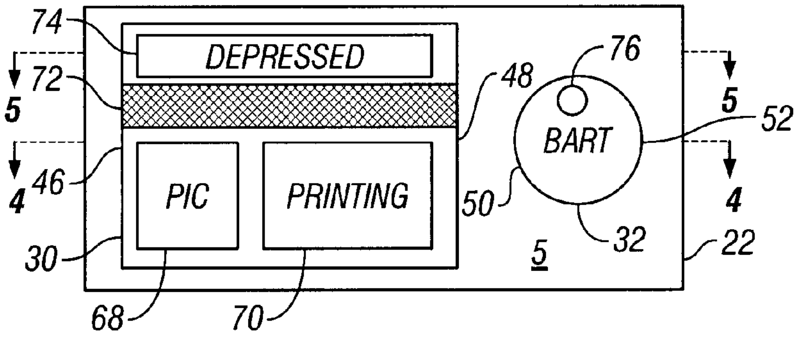

FIGS. 1 and 2 show plates 20, 22 of a suitable card material in a standard size and shape which a card printer can accommodate. Depending upon the particular card printer that is used, the plates 20, 22 may be the size of a business card, or it may be in the nature of 3-inches by 10-inches, or it may be another suitable and standard size and shape, for example. The point is that card printers are generally designed to process plates of one specific size and shape. If a customer wants to use his own size and shape, he may have to absorb the cost of designing and building a new machine. The invention is designed to avoid this cost.

By way of example only, FIG. 1 shows a plate 20 with segments that might be a luggage or identification badge 24, a star 26, and a sheriffs badge 28. The logo 66 might be a thermally printed name of a detective or law enforcement agency, for example. FIG. 2 shows a card 22 with segments forming business card 30 and a dog tag 32. Of course, these are merely examples. Within reason, segments of any suitable design may be accommodated.

Figure 3:
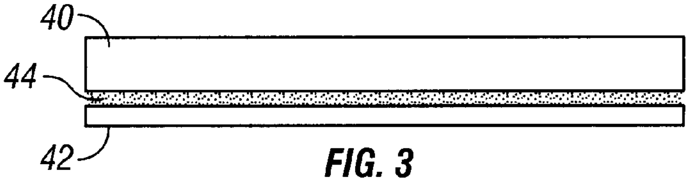
FIG. 3 is a side elevation view showing how the card material is assembled on a sheet of backing material.

FIG. 3 shows a side elevation view of a plate made of any suitable card material 40, such as the thermal printing plastic described in the above cited patents, PVC, and other materials which will readily occur to those who are skilled in the art. A sheet 42 of suitable backing material is adhered to the bottom of the card material plate 40, preferably by means of a or releasable pressure sensitive adhesive 44. An example of a suitable backing material is a or a PVC of thickness required to have the material pass through the digital printer depending on thickness of material being printed plastic coated release paper which is found on the thermal printing material of the above identified patents.

Many of the card materials that are available for this inventive process do not come with a backing paper. In order to keep the material forming segments from separating from the card material while being cut, these materials are attached to a backing paper with an easy release adhesive. This way, the outside size and shape which the currently available card printers require is retained, so that the material can be printed, while the card is adapted to the customer's needs.

Figure 4:
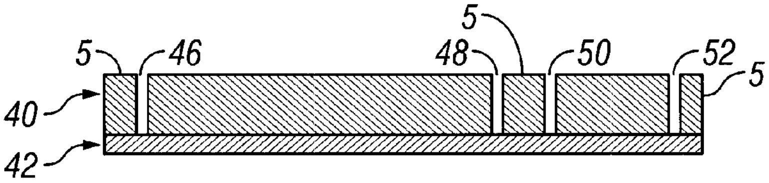
FIG. 4 is a cross section taken along line 4—4 of FIG. 2.

Once the backing material 42 is bonded to the plate of card material 40, the plate is subjected to suitable means which "kiss cuts" the card material into segments as shown in FIG. 4. This "kiss cutting" may be carried out by a die, laser, shearing, or engraving machine (hereinafter collectively called "die"). In greater detail, the die or the like (not shown) penetrates and cuts the card material 40, but does not enter into or cut the sheet backing material 42. The resulting cuts are defined in FIG. 4 by the vertical edges 46, 48 of the business card segment 30. The cuts 50, 52 define the edges of the dog tag segment 32. If the cross section is taken some place other than line 4—4 of FIG. 2, the cut marks would conform to the locations of the edges of the segments where the cross section is taken. The notation "S" indicates selvage that is to be discarded.

The point is that each segment is cut completely through the thickness of the card material 40, but the segment or segments are held in place by the sheet of backing material 42. Hence, the entire plate 20 or 22 remains intact and in a shape and size which may be fed through the card printer.

The next step depends upon how the segment is to be treated in order to customize the material 40. For example, FIG. 1 shows a tag 24 having a slot or hole 46 for receiving a strap or ribbon so that it can hang on luggage or around the neck. The users name and address 54 might be debossed in thermal printing material and his picture 56 printed by a card printer. The inventive process also lends itself to silk screening, hot stamping, and other printing techniques. Hereinafter, all of these and other printing techniques are herein called "forming an image". Any of these techniques may be mixed or matched.

A star 26 or badge 28 may be provided for a security guard, for example. The star 26 has a hole 60 so that it may be attached to a chain or a key ring for example. The name 62 may be applied by a card printer, or other image forming means, for example. The badge 28 may have a guard's picture 64 printed thereon by a card printer and perhaps a company logo 66 hot stamped thereon.

Figure 2A:
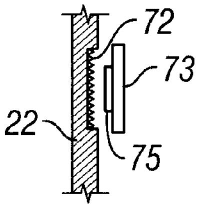
FIG. 2A is a cross section of a textured area of a badge and a transparent tape with graphics on the back being applied over the texture.

The business card 30 of FIG. 2 might have the user picture 68 and other printed material 70 (name, address, occupation, title, etc.) applied by a card printer or other image forming means. A textured area 72 provides a number of shallow depressions to receive a pressure adhesive, transparent tape 73 (FIG. 2A) without leaving air bubbles under the tape. Some of the cited patents explain how graphics 75 may be placed on the back of the transparent tape 73 so that when viewed through the tape, the graphics appear to be integral with and sealed into the plastic of the card material. This arrangement enables a business, for example, to buy blank cards which may be customized to identify the individual who receives a card.

Also, a depressed area, which may be made either before or after the kiss cut, may be provided to establish an aid for alignment in order to receive a sticker, decal, ornamentation, or the like. For example, the sticker might say "manager" or some other identifying information which individualizes an otherwise generic card. Or the depression might receive an ornamentation such as mother of pearl, or the like.

Figure 5:
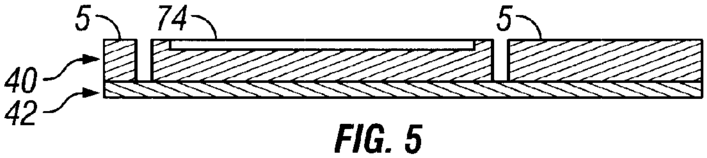
FIG. 5 is a cross section taken along line 5—5 of FIG. 2.

FIG. 5 is a cross section taken along line 5—5 of FIG. 2 and shows depression 74 which represents any and all of this type of customization. The depression 74 may be made in any suitable shape and simultaneously with the texture at 72. For example, it could be an angel in bas relief.

The business card 30 is intended to show that the end product may be complex. The dog tag 32 is intended to show that the invention may also include the very simple. Item 76 is a simple hole for securing the dog tag to a ring, or the like, on a dog collar.

Figure 6:
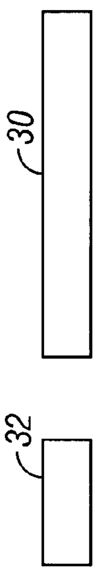
FIG. 6 is a side elevation showing the separated segments after the backing material has been peeled away and the selvage is removed.
Figure 7:
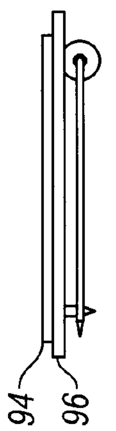
FIGS. 7–9 show exemplary findings which may be applied to the individual if segments.
Figure 8:
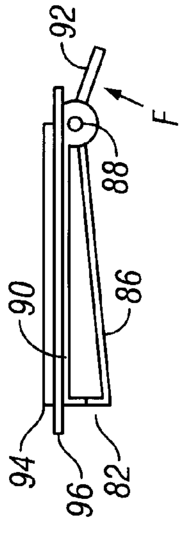
Figure 9:
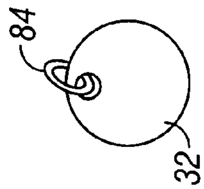

As shown in FIG. 6, once the segments are completed and the card printer has printed a suitable image, etc., the backing material may be peeled away and the selvages discarded leaving the segments 30, 32 as free standing badges. Then, any suitable findings may be applied thereto. For example, FIG. 7 shows a pin back, FIG. 8 shows an alligator clip 86, and FIG. 9 shows a simple jump ring 84. The alligator clip has a movable jaw 86 pivotally attached at 88 to a stationary jaw 90 and spring biased to a closed position. When a force F is applied to an end 92 of lever 82, it moves away from stationary jaw 90 to admit part of clothing into the jaw. When force F is removed, the jaws close to capture the part of clothing. Any other suitable findings may be used.

Since some card materials are too weak to be a free standing badge, FIGS. 7 and 8 show the card material 94 adhered to a metal or other plate 96. If the card material is, say, PVC or another sturdy material, the metal backing plate may not be required.

Figure 10:
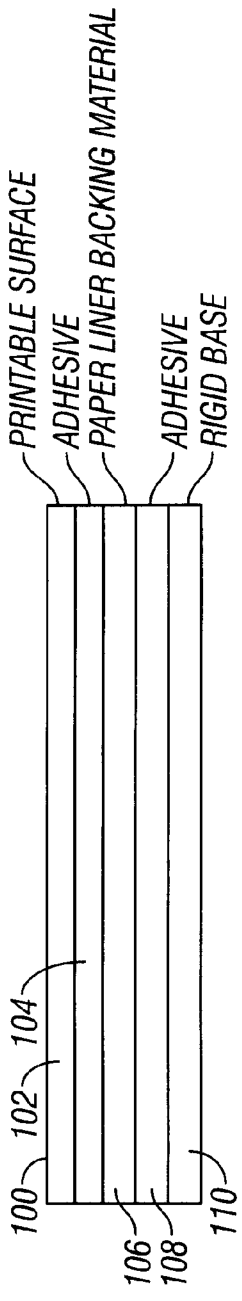
FIG. 10 is a side elevation of a structure formed by a flexible material which has a rigid carrier plate temporarily added to the back during their trip through the card printing machine.

In greater detail, some of the material which may be used to make badges may be relatively flexible. Perhaps, the badges might be sew-on patches, appliques, materials to be attached or adhered to cloth by a hot iron, or the like. Perhaps the badge might be a name plate to be added to a plaque or sign that hangs on a wall or sets on a desk. For what ever reason, the desire is to make a flexible badge which is not rigid enough to travel through a card printer machine. For this situation, a laminate structure such as that shown in FIG. 10 may be used. The printable surface 100 may be the exposed surface on any suitable flexible or semi-flexible badge material 102 such as plastic, fabric, paperboard, or the like. The rear surface of badge material 102 is covered by a first pressure sensitive adhesive 104, and then covered by a paper liner backing 106. Depending upon the nature of the desired end product, the liner paper 106 backing may be either a removable release paper or a non-release paper which is permanently bonded to the flexible badge material 102.

Next, a second layer of pressure sensitive material 108 is placed on the underside of paper liner 106. Depending upon the particular needs of a particular product, a release paper (not shown) may temporarily protect the second layer of adhesive 108. However, the adhesive layer 108 and its associated laminate 102–106 is placed on a rigid base layer 110 which is sturdy enough to go through the card printer machine. An example of a suitable rigid material is a relatively thin card made of PVC.

The second layer 108 of adhesive is pressed directly on the rigid base 110 and then the layers 102–106 of the laminate are "kiss cut. Then the card is sent through the card printing machine while the second adhesive layer 108 holds the segments in place on the rigid base. Then the laminate including the flexible material is peeled away from the rigid base 110.

The resulting product may involve a substantial or insubstantial amount of do-it-yourself work depending upon the customer's desires. For example, if the customer owns or has access to a card printer and a digital camera, he may apply his own pictures 56, 64, 68. If he does not have such access, he may have the picture taken by someone having such a camera and then have them supply the picture to him on a floppy disk which may drive the card printer. Indeed, many modern film processors will generate digital pictures from 35-mm pictures taken by conventional cameras, and deliver them recorded on a suitable memory means. Other customers may own or have access to printers which apply graphics to the back of transparent tape for application over textured area 72. Still other customers may buy blank badges having some graphics debossed on the thermal plastic and then customize those blanks in their own way for the individual who will wear the completed badges. For example, these customers might do their own silk screening.

Hence, a relatively great flexibility is realized by the invention for enabling the manufacturer and the user to accommodate a great variety of styles, graphics, methods of operation, and the like.

Those who are skilled in the art will readily perceive various modifications which fall within the scope and spirit of the invention. Therefore, the appended claims are to be construed to cover all equivalents falling within such scope and spirit of the invention.

What is claimed is:

1. A process for making plastic badges comprising the steps of:

(a) removably applying a sheet of backing material to a plastic plate of a fixed size and shape and made of a card material, and adding a rigid base adhered to said backing material;

(b) providing means for forming contours of a unique size and shape which is not said fixed size and shape for at least one segment of said plastic plate;

(c) kiss cutting through the thickness of said plastic plate without cutting said sheet of backing material applied in step (a) whereby said sheet of backing material holds said segment in place in said plastic plate;

(d) running said plate which is cut in step (c) through a card printer; and (e) peeling said sheet of backing material and rigid base away from said plastic plate, thereby freeing said badge segment.

2. The process of claim 1 and the further step of providing thermal debossible material of use in step (a), said sheet of backing material being release paper applied to the back of said thermal debossible material.

3. The process of claim 2 and the further step of forming an image on said plastic plate of card material in order to provide a partially customized badge for further manufacture in step (d).

4. A process of making plastic badges comprising the steps of:

(a) removably applying a sheet of release backing material to the back of a plastic plate made of a card material;

(b) providing cutting means for forming contours of a desired shape for at least one segment of said plastic plate;

(c) using said cutting means of step (b) for kiss cutting through the thickness of said plastic plate without cutting said sheet of backing material applied in step (a) whereby said sheet of backing material holds said segment in place in said plastic plate;

(d) forming an image on said plastic plate of card material for providing a partially customized badge for further manufacture in step (e), said step of forming of said image being carried out between steps (a) and (c);

(e) running said plate which is cut in step (c) through a card printer; and (f) peeling said sheet of backing material away from said plastic plate, thereby freeing said badge segment.

5. The process of claim 3 wherein said step of forming said image is carried out between steps (c) and (d).

6. The process of either claim 4 or claim 5 wherein said step of forming said image includes at least one step selected from a group consisting of printing, forming a depression, forming a textured surface, forming a logo, silk screening, or hot stamping.

7. The process of either claim 1 or claim 4 and the added step of applying a finding to mount said badge segment.

8. The process of claim 7 wherein said finding is selected from a group consisting of pin backs, alligator clips, and jump rings.

9. A process for using card printers adapted to receive cards of a fixed size and shape for printing graphic material on a card having a unique size and shape which is not said fixed size and shape, said process comprising the steps of:

(a) forming a laminate of card materials in said fixed size and shape with at least one layer temporarily coupled to another layer by a release means;

(b) cutting said one layer into segments having said unique size and shape without cutting said other layer, said other layer temporarily holding said segments of said one layer in place, whereby said one layer retains said fixed size and shape;

(c) running said card of step (b) through a card printer, said laminate comprising at least one layer of a rigid base material attached to the bottom of said laminate during step (c); and (d) peeling away and separating said segments from said card after it has passed through said card printer.

10. The process of claim 9 wherein said one layer is a thermally debossible material, and the further step of customizing said card by performing at least one step selected from a group consisting of thermally debossing said one layer, forming a textured area on said one layer, applying transparent tape with graphics to said textured area, depressing an aligning area, applying a sticker to said depressed area, and applying a logo to said card.

11. The process of claim 10 and the further step of adding finding means for attaching said badge to a suitable supporting structure.

12. The process of claim 9 wherein said laminate of step (a) comprises a flexible material having a printable front and exposed surface thereon, a first adhesive layer on the back of said flexible layer, a layer of backing material on a back of said adhesive material, a second layer of adhesive material on the back of said backing material, and a rigid base material adhered to a said second adhesive material.

13. The process of claim 12 wherein said second layer is a pressure sensitive adhesive and a surface of said rigid base material has a release surface therein.

* * * * *